United States Patent [19]

Wylie

[11] Patent Number: 5,195,575
[45] Date of Patent: Mar. 23, 1993

[54] PASSIVE THREE-PHASE HEAT TUBE FOR THE PROTECTION OF APPARATUS FROM EXCEEDING MAXIMUM OR MINIMUM SAFE WORKING TEMPERATURES

[76] Inventor: Roger Wylie, Wylie Engineering & Construction 5907 Bayway Dr. Bay Suite, Baytown, Tex. 77520

[21] Appl. No.: 682,319

[22] Filed: Apr. 9, 1991

[51] Int. Cl.$^5$ .............................................. F28D 15/02
[52] U.S. Cl. .............................. 165/132; 165/104.14; 376/367; 126/422
[58] Field of Search ................... 165/32, 104.21, 140, 165/104.14, 104.13; 126/420, 422, 433; 376/367

[56] References Cited

U.S. PATENT DOCUMENTS

| | | | |
|---|---|---|---|
| 3,618,660 | 11/1971 | Busse | 165/104.14 |
| 3,866,424 | 2/1975 | Busey | 165/104.14 |
| 4,131,158 | 12/1978 | Abhat et al. | 165/104.14 |
| 4,560,533 | 12/1985 | Huebotter et al. | 165/70 |
| 4,582,125 | 4/1986 | Baur | 165/104.14 |

FOREIGN PATENT DOCUMENTS 1937782 2/1971 Fed. Rep. of Germany ........ 165/32

Primary Examiner—Albert W. Davis, Jr.
Attorney, Agent, or Firm—Neal J. Mosely

[57] ABSTRACT

Safety equipment is disclosed comprising a three-phase heat pipe for the protection of apparatus from exceeding maximum or minimum safe working temperatures. The heat pipe has a working fluid selected so that it will not function below the desired temperature. A working fluid which has a melting point slightly above the minimum safe temperature of the equipment to be protected is preferred for protecting equipment from exceeding its minimum safe working temperature. This heat pipe may be used to cool an apparatus to a temperature where the heat pipe automatically stops functioning and keeps an apparatus from exceeding its minimum design temperature. A working fluid which has a melting point slightly below the maximum safe temperature is preferred to keep equipment from exceeding its maximum safe working temperature. This heat pipe will be inactive at normal operating temperatures but will release excess heat to cooler surroundings before safe working temperatures are exceeded. Transfer may also be by capillary action in a heat pipe having a wick.

26 Claims, 4 Drawing Sheets

2

PASSIVE THREE-PHASE HEAT TUBE FOR THE PROTECTION OF APPARATUS FROM EXCEEDING MAXIMUM OR MINIMUM SAFE WORKING TEMPERATURES

BACKGROUND OF THE INVENTION

1. Field of the Invention

This invention relates to new and useful improvements in safety equipment for the protection of an apparatus from exceeding its safe operating temperature range, and more particularly to safety equipment which is simple, passive, extremely reliable, and does not release the contents of the apparatus to the atmosphere.

2. Brief Description of the Prior Art

It is well known that when heat is added to and removed from an apparatus the amount of heat removed and the amount of heat added must be precisely the same amount or the temperature of the equipment will eventually exceed either its maximum safe working temperature or its minimum safe working temperature. Instruments and controllers in various degrees of sophistication are added to the apparatus depending on the complexity of the apparatus. Redundant controls are added to very critical types of apparatus. Whenever possible a passive safety device is installed for the eventuality that the control system fails. When the contents of an apparatus can be vented to the atmosphere a safety valve may be used to vent the contents of the apparatus directly to the atmosphere, or indirectly by venting the contents through a flare system. When it is uneconomical or environmentally unacceptable to vent the contents of an apparatus to the atmosphere a passive safety system is more difficult to design, and in the case of atomic power plants a design for a passive safety system has not been realized.

The simplicity and reliability of the passive heat pipe has been recognized. This apparatus was chosen to maintain the permafrost under the Alaskan pipeline. Its reliability has been proposed as a way of eliminating some of the redundancy in atomic power plants.

Burelbach et al U.S. Pat. No. 4,478,784 discloses the use of a heat pipe for maintaining adjacent or related components of a nuclear reactor within specified temperature differences.

Huebotter et al U.S. Pat. No. 4,560,533 discloses the use of heat pipe exchangers to transfer energy from the primary coolant to the steam/water coolant system of an atomic power plant.

Neider et al U.S. Pat. No. 4,727,455 discloses a semiconductor power module with an integrated heat pipe for regulating temperature.

The reliability of the heat pipe results since only gravity or capillary action in a wick is necessary for the heat pipe to function. Conventional two-phase heat pipes located in the vertical position use gravity for working fluid circulation and comprise a vertical pipe containing liquid which is vaporized from the bottom end and flows as a vapor to the upper end where the vapors condense and flow by gravity back to the bottom end. Heat pipes which must transfer heat horizontally use capillary action in wicks for working fluid circulation. In horizontal heat pipes, capillary wicks transfer liquid from one end of the pipe where the vapors condense to the other end where the liquid is vaporized.

The simplicity of the heat pipe results from its construction, which may be as simple as only a sealed tube partially filled with a liquid. Various extended surface designs may be used externally to increase the capacity of an individual pipe. Internals may also be used to increase the capacity of a pipe. Heat exchanger bundles are made by installing parallel pipes. The interior volume may be tied together, or they may be individually sealed so that the failure of one pipe will not affect the performance of the remaining pipes.

The operation and construction of two phase heat pipes are well known, and these construction techniques will be used in the design of the three phase heat pipe which constitutes this invention. They are not a part of this invention but will be discussed briefly below.

SUMMARY OF THE INVENTION

One of the objects of this invention is to provide a simple passive safety device which could be used on apparatus such as home solar heating system.

Another object of this invention is to provide a reliable passive safety system for atomic power plants so that much of the redundant equipment, and possibly the containment building, could be eliminated.

Another object of this invention is to provide a retrofit passive safety system for existing nuclear power plants for improving their safety.

Another object of this invention is to provide a reliable passive safety system comprising a three-phase heat pipe which protects apparatus from exceeding its minimum safe working temperatures.

Another object of this invention is to provide a reliable passive safety system comprising a three-phase heat pipe which protects apparatus from exceeding its maximum safe working temperatures.

Another object of this invention is to provide a reliable passive safety system which protects apparatus from exceeding maximum or minimum safe working temperatures.

A further object of this invention is to provide a reliable passive safety system which protects apparatus from exceeding maximum or minimum safe working temperatures and comprises a three-phase heat pipe having a working fluid selected so that it will not function below the desired temperature.

A further object of this invention is to provide a reliable passive safety system which protects apparatus from exceeding maximum or minimum safe working temperatures and comprises a three-phase heat pipe having a working fluid with a melting point slightly above the minimum safe operating temperature so that it will not function below the desired temperature.

A further object of this invention is to provide a reliable passive safety system which protects apparatus from exceeding maximum or minimum safe working temperatures and comprises a three-phase heat pipe having a working fluid with a melting point slightly below the maximum safe operating temperature so that it will not function below the desired temperature.

A further object of this invention is to provide a triggered three-phase heat pipe which will provide a reliable safety system to protect apparatus which has normal operating temperatures above the melting point of the working fluid.

Other objects of the invention will become apparent from time to time throughout the specification and claims as hereinafter related.

These objects and other objects of the invention are accomplished by a safety equipment comprising a three-phase heat pipe for the protection of apparatus from exceeding maximum or minimum safe working temperatures. The heat pipe has a working fluid selected so that it will not function below the desired temperature. A working fluid which has a melting point slightly above the minimum safe temperature of the equipment to be protected is preferred for protecting equipment from exceeding its minimum safe working temperature. This heat pipe may be used to cool an apparatus to a temperature where the heat pipe automatically stops functioning and keeps an apparatus from exceeding its minimum design temperature. A working fluid which has a melting point slightly below the maximum safe temperature is preferred to keep equipment from exceeding its maximum safe working temperature. This heat pipe will be inactive at normal operating temperatures but will release excess heat to cooler surroundings before safe working temperatures are exceeded. In a two-phase heat pipe, liquid accumulates in one end and receives heat which vaporizes the liquid which vapor goes to the other end of the pipe where it is condensed and transfers heat energy. Transfer may also be by capillary action in a heat pipe having a wick. In a three-phase heat pipe, the working fluid has a melting point slightly above a minimum critical temperature or slightly below a maximum critical temperature depending on whether the apparatus is being protected from exceeding its maximum or minimum working temperature and thus transfers heat from one end of the pipe to the other, as in the case of the two-phase heat pipe, but condenses as a solid in the middle or upper end portion of the pipe to stop its operation when that portion of the pipe drops below the melting point of the fluid.

DESCRIPTION OF PRIOR ART TWO-PHASE HEAT PIPES

Figure 1:
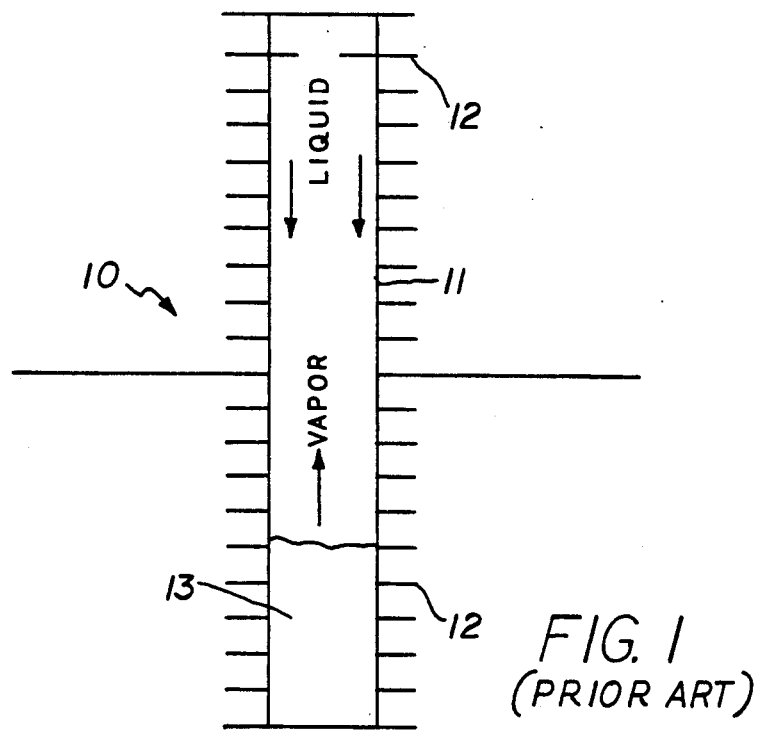
FIG. 1 is a schematic view of a vertically oriented, gravity type of two-phase heat pipe known to the prior art.
Figure 2:
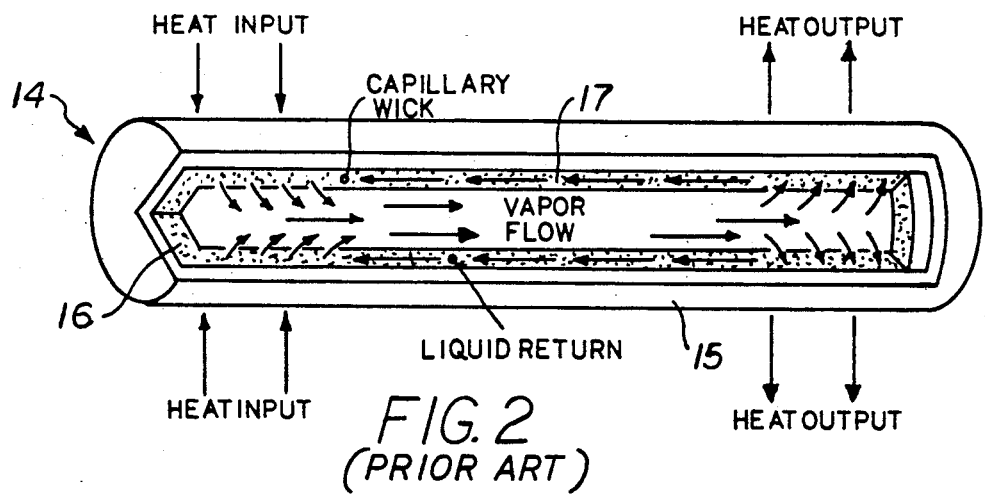
FIG. 2 is a schematic view of a horizontally oriented, capillary or wick type of two-phase heat pipe known to the prior art.

Referring to the drawings by numerals of reference, and more particularly to FIGS. 1 and 2, there are shown two examples of two-phase heat pipes which have been used for heat exchange purposes. These are PRIOR ART devices which are described here as a setting for the description of the preferred embodiments of this invention.

In FIG. 1, a heat pipe 10 is shown comprising a closed end tube 11 with heat exchange fins 12 or other suitable means for facilitating heat exchange with the ambient medium. Tube 11 is shown in a vertical position and is charged with a volatile liquid 13. The lower end of tube 11 is positioned to receive heat from ambient medium which vaporizes liquid 13. The vapors flow upward to the top end of tube 11 where they are condensed to transfer heat to a cooler surrounding medium. The condensed liquid then flows back to the bottom end of tube 11 and the process of heat exchange by vaporization and condensation continues as long as the temperature at the lower end is sufficient to vaporize the liquid. The heat exchange is exclusively two-phase, liquid and gas.

In FIG. 2, there is shown another embodiment of the two-phase heat pipe for transferring heat horizontally. This embodiment of the two-phase heat pipe 14 comprises a closed end tube 15 with suitable means for facilitating heat exchange with the ambient medium. Tube 15 is shown in a horizontal position and is charged with a volatile liquid 16. A capillary wick 17 extends from end to end of tube 15. The left end of tube 15 is positioned to receive heat from ambient medium which vaporizes liquid 16. The vapors flow horizontally to the right end of tube 15 where they are condensed to transfer heat to the surrounding medium. The condensed liquid is absorbed into wick 17 and then flows back to the left end of tube 15 where the process of heat exchange by vaporization and condensation continues as long as the temperature at the left end is sufficient to vaporize the liquid. The heat exchange is exclusively two-phase, liquid and gas with horizontal return of the liquid by capillary action.

Two-phase heat pipes have had a wide range of utilization but have not provided for control at low temperatures as well as high temperatures. This deficiency in two-phase heat pipes led to the development of the three-phase heat pipe which is the subject of this invention.

DESCRIPTION OF THE THREE-PHASE HEAT PIPES

Figure 3:
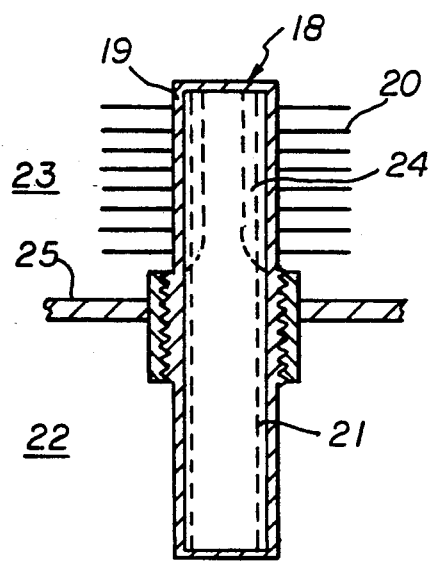
FIG. 3 is a sectional view of an automatic three-phase heat pipe forming one embodiment of this invention.
Figure 4:
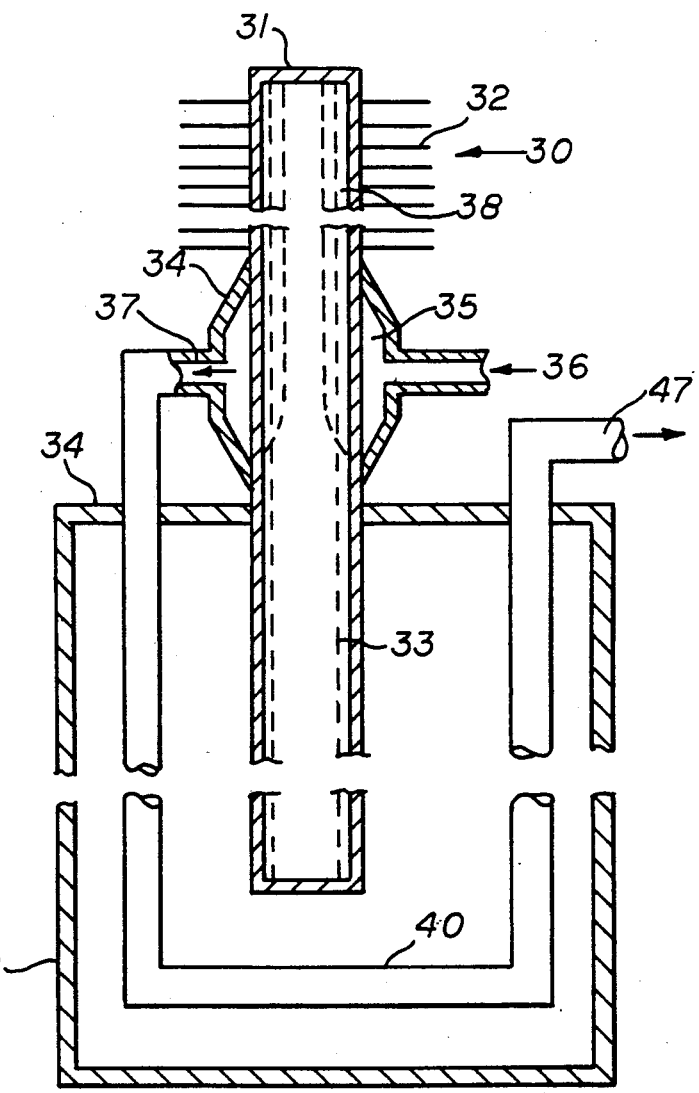
FIG. 4 is a sectional view of a triggered three-phase heat pipe forming another embodiment of this invention.

Two designs for the three phase heat pipe are presented in FIGS. 3 and 4. These designs are for removing heat energy from a warm or hot medium to a cooler medium. The warm or hot medium may be an apparatus which is to be protected and the cool medium may be atmosphere or other heat sinks such as, but not limited to, bodies of water, ground, or space, when protecting an apparatus from being cooled below its minimum safe working temperature. The three-phase heat pipes are characterized by their use of a working fluid (liquid) which has a melting point slightly above the minimum temperature and thus transfers heat from one end of the pipe to the other, as in the case of the two-phase heat pipe, but condenses as a solid in the middle or upper end portion of the pipe to stop its operation when that portion of the pipe drops below the melting point of the fluid. The liquid is selected from a handbook chart of melting points of liquids in the range of operation of the heat pipe. Two types of three-phase heat pipe are shown, viz., automatic and triggered.

AUTOMATIC THREE-PHASE HEAT PIPES

The automatic three-phase heat pipe is shown in FIG. 3 and would be used for apparatus which normally operate at temperatures below the melting point of the working fluid. The illustration shown in FIG. 5 is for a three-phase heat pipe as the safety device on a solar hot water heater.

In FIG. 3, a heat pipe 18 is shown comprising a closed end tube 19 with heat exchange fins 20 or other suitable means for facilitating heat exchange with the ambient medium. Internals 21, i.e., internal heat exchange means, are provided where needed to facilitate heat exchange. Tube 19 is shown in a vertical position and is charged with a volatile liquid. The liquid used is selected to have a melting point which is just below the maximum temperature of operation of the system.

The lower end of tube 19 is positioned in a Wall 25 dividing the hot region from the cooler region to receive heat from ambient medium 22 which vaporizes the liquid in the tube. The vapors flow upward to the top end of tube 19 where they are condensed to transfer heat to the surrounding medium 23. The condensed liquid then flows back to the bottom end of tube 19 unless the temperature at the upper end is below the melting point of the liquid, in which case, the vapors condense as a solid 24 at the upper end and the process of heat exchange ceases when all of the liquid has solidified at 24. The process of heat exchange by vaporization and condensation continues as long as the temperature at the lower end is sufficient to vaporize the liquid and the temperature at the upper end is above the melting point of the working fluid. The heat exchange is therefore three-phase, liquid, solid and gas.

Figure 5:
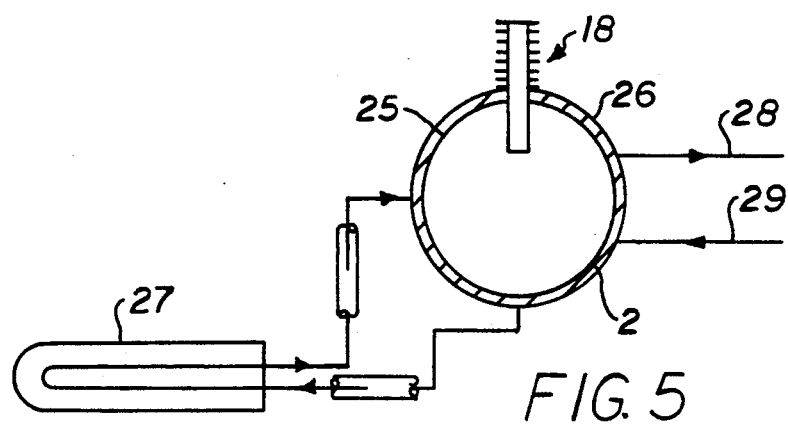
FIG. 5 is a schematic view of an automatic three-phase heat pipe installed to protect a solar water heating system in accordance with this invention.

In FIG. 5, the three-phase heat pipe of FIG. 3 is shown installed as the safety device on a solar hot water heater. The heat pipe 18 is installed in the wall 25 of hot water storage tank 26. Water is heated by a thermosyphon evacuated tube solar heater 27. Hot water is withdrawn as needed through line 28 and replaced with cold water through line 29.

Evacuated tube solar water heaters are capable of providing water above the 140° F. practical limit of flat solar units. Their disadvantage is that their shut-in temperature can exceed 600° F. if not protected by safety devices. As described above, one or more heat pipes 18 penetrate the wall 25 of the hot water storage tank 26. Durene or napthylene, which melt at about 176° F., is chosen for the working fluid for this example. At temperatures below 176° F. in the hot water tank 26 the working fluid remains a solid in the top portion of the heat pipe 18. Whenever the temperature in the hot water tank exceeds 176° F., some of the working fluid melts and the three-phase heat pipes 18 gradually start to function. If the temperature in the hot water storage tank continues to rise, more of the heat pipe capacity is utilized. The design heat removal capacity of the heat pipes 18 is sufficient to prevent the apparatus from exceeding its safe working temperature The automatic heat pipe, as just described, may also be used to prevent equipment from exceeding its minimum safe working temperatures. In space and arctic climates where night and day and seasonal temperature vary, the three-phase heat tube may be used to remove heat from an apparatus during warmer periods. By properly selecting the freezing point of the working fluid, the heat removal by the heat tube stops at any minimum selected temperature.

TRIGGERED THREE-PHASE HEAT PIPES

Figure 6:
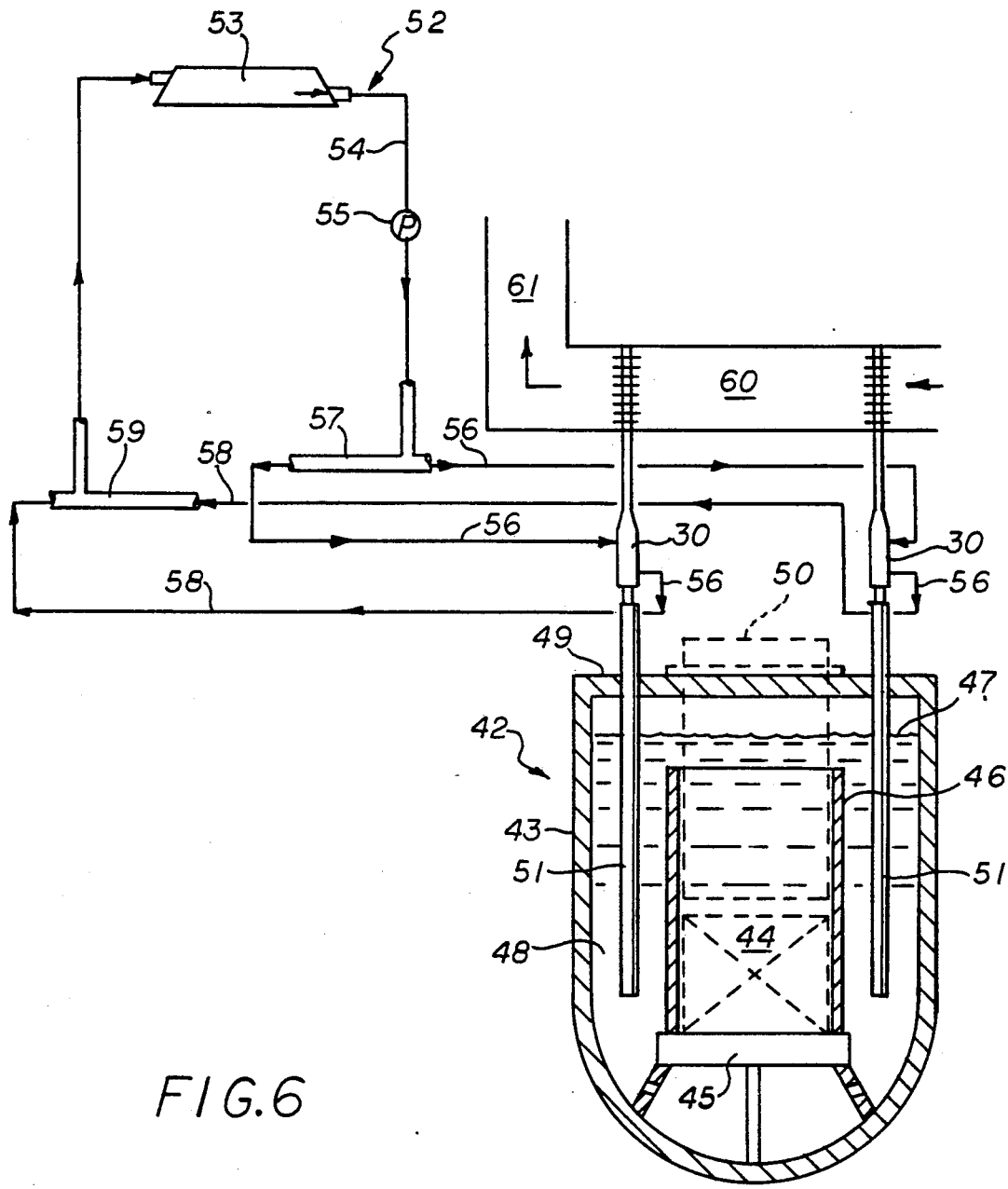
FIG. 6 is a schematic view of a triggered three-phase heat pipe embodying this invention installed to protect a Fast Reactor Atomic Power Plant using as in U.S. Pat. No. 4,478,784.
Figure 7:
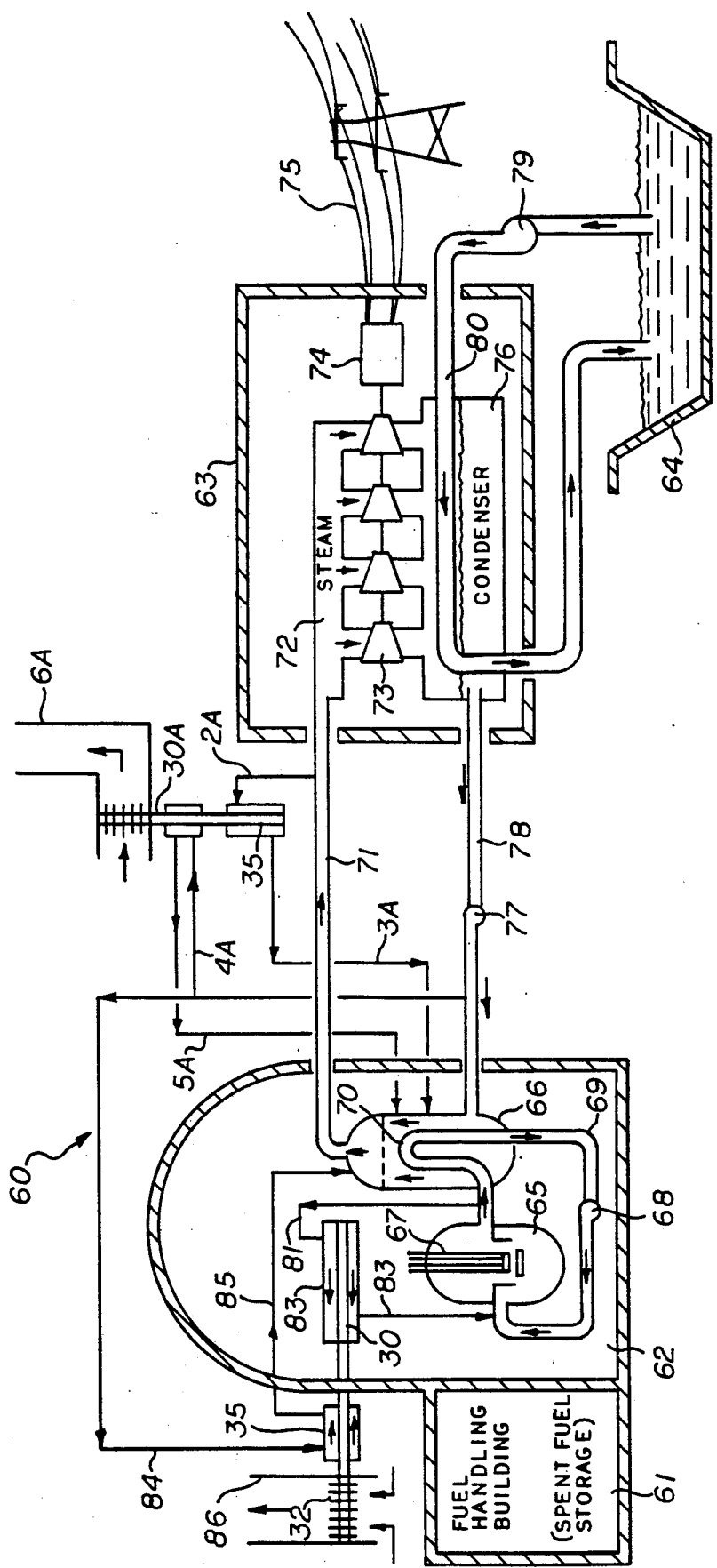
FIG. 7 is a schematic view of a triggered three-phase heat pipe embodying this invention installed to protect (retrofit) an existing Pressurized Water Atomic Power plant.

A triggered three-phase heat pipe is shown in FIG. 4 for use as a safety device on apparatus which have a normal operating temperature above the melting point of the working fluid. Specific applications of the triggered three-phase heat pipe are shown in FIGS. 6 and 7.

In FIG. 4, a heat pipe 30 is shown comprising a closed end tube 31 with heat exchange fins 32 or other suitable means for facilitating heat exchange with the ambient medium. Internals 33, i.e., internal heat exchange means, are provided where needed to facilitate heat exchange. Tube 31 is shown in a vertical position and is charged with a volatile liquid. This heat pipe is used when a suitable working fluid cannot be found which has a melting point which is above the normal operating temperature of the apparatus.

The lower end of tube 31 is positioned in a wall 134 dividing the hot region from the cooler region to receive heat from ambient medium which vaporizes the liquid in the tube. The vapors flow upward to the top end of tube 31 where they are condensed to transfer heat to the surrounding medium. The condensed liquid then flows back to the bottom end of tube 31. A jacket 34 surrounds tube 31 defining an annulus or annular chamber 35 having an inlet 36 and outlet 37 for circulation of a cooling fluid therethrough.

The cooling fluid flowing through annulus 35 cools the upper end of tube 31 to a temperature below the melting point of the liquid whereupon the vapors condense as a solid 38 at the upper end and the process of heat exchange ceases when all of the liquid has solidified at 38. If there is a loss of flow of the cooling fluid through annulus 35 or if the temperature of the cooling fluid rises substantially, the solidified working fluid 38 melts and flows to the bottom of tube 31 where the heat transfer process begins. The process of heat exchange by vaporization and condensation is therefore triggered by increase in temperature in the annulus 35 above the melting point of the working fluid and continues as long as the temperature at the lower end is sufficient to vaporize the liquid and the temperature at the upper end is above the melting point of the working fluid. The heat exchange is therefore three-phase, liquid, solid and gas.

The triggered three-phase heat pipe in FIG. 4 was described generally above but will be understood more completely by reference to the setting in which it is used. A fast reactor atomic power plant having heat pipe exchangers is selected for this example of the triggered heat pipe. A triggered three-phase heat pipe 30 is installed in each primary heat tube 39. Condensate produced by condensing the exhaust steam from the turbogenerators is routed through annulus 35 of the trigger section on the three-phase heat pipe 30. The size of the trigger is sufficient to keep the working fluid in tube 31 solidified, as at 38, as long as cool condensate is flowing through the annulus. The condensate flows through the heat exchanger pipe 40 in the primary heat pipe 39. Heat is removed from the hot vapors in the primary heat pipe 39. The condensate leaves the primary heat pipe 39 as steam or a steam-water mixture through outlet 41. Steam produced at roughly 600 psig and 500° F. from the stream is used to power the steam turbine driven electric generators.

Fins 32 on the cold end of the three-phase heat pipe 30 and internals 33 in the interior of the heat pipe 30 improve its heat removal capacity. Cool air flows across the fins 32 and the hot air leaving the fins is routed to a stack (not shown). The draft resulting from the hot air in the stack increases air flow across the fins 32. During normal operations a small amount of heat leaks up the walls of the three-phase heat pipe 30. This energy is recovered by the cool condensate flowing through the trigger 34, 35. If the condensate stream fails, flow through the annulus 35 of the trigger stops whereupon the solid working fluid 38 melts and the three-phase heat pipe 30 directs reactor energy to the atmosphere.

FIG. 6 shows the triggered three-phase heat pipe in a Fast reactor Power Plant having Heat Pipe Exchangers. The three-phase heat pipe is shown added to the drawings for an atomic power plant included in U.S. Pat. No. 4,560,533.

A fission reactor 42 is illustrated in FIG. 6 consisting of a vessel 43 within which a reactor core 44 is housed. The core 44 is mounted on a grid plate assembly 45 for support and distribution of a primary coolant. A cylindrical core barrel 46 defines the outer boundary for coolant flow upwardly from the core. In a pool-type reactor as illustrated, a primary coolant fills the vessel 43 to a level 47 well above the core 44 but just over the top of the core barrel 46. The primary coolant will be heated in the core 44 and discharged from the top thereof and spill over the core barrel 46 and reactor vessel 43. A primary pump (not shown) takes suction from the lower part of this annular region 48 and discharges the coolant to the grid plate assembly 45 to complete the closed flow loop for the primary coolant.

A reactor deck 49 overlies and closes the top of the reactor vessel 43. Upper internal structure, shown herein only schematically as 50, is supported from the vessel deck 49 to allow for reactor control. Flow baffles and radiation barriers, etc. will also be located within and/or surrounding the reactor vessel, but are not shown.

A plurality of heat pipe heat exchangers 51 extend downwardly into the annular region 48, supported from the fixed portion of the vessel deck 49. In a 100 megawatt electric plant approximately 500 heat pipes may be used. The heat pipes 51 are of the two-phase type described above and are preferably charged with liquid mercury which transfers heat from the bottom to the top of the heat pipes by vaporization. The heat pipes 51 have internal heat exchangers in the form of U-tubes which circulate coolant through the interior thereof. This structure is the same as shown in U.S. Pat. No. 4,560,533 and is not shown here although the connections for circulating the coolant to the heat pipes 51 are shown.

The U-tube in heat pipe 51 is connected in the pressurized water coolant system loop 52 including steam power turbine or expansion device 53, piping 54 and feedwater pump 55. The inlet leg 56 of one of the U-tubes is connected to a feedwater or inlet plenum 57 and the outlet leg 58 is connected to a steam or outlet plenum 59 to provide for parallel flow between plenums 57 and 59 through the pipes.

A three-phase heat pipe 30, as described above, is added to each primary heat pipe 51. Condensate is supplied by boiler feed water pumps 55 through headers 56 and 57 to the triggers on the three-phase heat pipes. Condensate from the triggers is routed through pipes in the primary heat pipes 51 and converted to steam and routed through headers 58 and 59 for the production of power in steam turbogenerator 53.

Whenever the supply of condensate fails, the three-phase heat pipes are activated. Air in plenum 60 is heated and flows into stack 61. The warm gases in stack 61 cause a draft at the bottom of the stack which pulls cool atmospheric air through plenum 60.

Since both the primary heat pipes 51 and the three-phase heat pipes 30 are passive, the energy of the atomic reactor could be safely released to the atmosphere without the aid of any outside power. The inherent safety of an atomic power plant designed with the heat pipes significantly reduces the amount of redundant equipment needed for atomic power plants. It may also be possible to eliminate the containment building.

FIG. 7 shows a possible installation of the three-phase heat pipe on an existing nuclear power plant. A schematic drawing of Houston Light & Power's Pressurized Water Reactor power plant is used for this example with triggered three-phase heat pipes 30, as shown in FIG. 4 superimposed thereon. Two alternate locations for the heat pipes are shown.

The power plant 60 comprises a fuel handling building 61, a reactor containment building 62, turbine-generator building 63 and water cooling reservoir 64. The fuel handling building includes storage for spent fuel. The reactor containment building 62 contains the reactor vessel 65 and steam generator 66. Reactor vessel 65 contains fuel elements 67 surrounded by high pressure water which circulates therethrough to remove heat from the fuel elements. High pressure hot water is circulated by pump 68 through lines 69 and heat exchanger 70 (forming the primary cooling loop) to transfer heat to water in steam generator 66 to supply steam for power generation.

Steam flows through line 71 and manifold 72 to a bank of steam turbines 73 (forming the secondary loop) which operate a generator 74 supplying electric power to power lines 75. Spent steam from generators 73 is condensed in condenser 76 and returned by pump 77 through line 78 back to steam generator 66. Steam condensation is accomplished by cooling water circulated from the water reservoir 64 by pump 79 through heat exchanger 80 and thence back to the reservoir 64 (forming the tertiary loop).

Installation of triggered heat pipes 30 on the primary water loop protects the reactor from failure of any piece of equipment in the reactor energy to electrical power facilities. A bundle of three-phase triggered heat pipes 30 is installed above the reactor. Lines 81 and 82 connect high pressure hot water from the primary loop to a water jacket 83 on the heat pipe bundle. The lines are installed so that thermosyphon flow is established if all the primary recirculation pumps failed. A portion of the condensate in line 78 to the steam generator 66 is routed by lines 84 through each trigger 35 on the heat pipes 30. The condensate from the trigger 35 is routed back to the steam generator 66 through line 85. Plenums and a draft stack 86 is provided to induce cool atmospheric air across the heat exchange fins 32 of the heat tube bundle during emergencies. So long as condensate is circulating through trigger 35, the heat pipes 30 have the working fluid solidified in the region of the trigger which renders the heat pipe inoperative to transfer heat. If there is a failure in circulation of condensate, the working fluid in the heat pipes 30 melts and the heat pipe begins to function as described above for FIG. 4.

The only critical piece of mechanical equipment in the primary loop is the recirculation pumps. Since redundancies have already been installed it may be more desirable in existing plants only to protect for failures in the more complex steam generating/condensing facilities. The location of a three-phase heat pipe 30A protects only this section of the plant.

The heat pipe 30A is located above the steam generator 66. A connection 2A from the steam line 71 to the heat pipe bundle and a condensate return line 3A from the bundle to the steam generator 66 is provided. Again, these lines are so routed that thermosyphon flow is established if the main condensate flow is interrupted. A portion of the cool condensate from line 78 flows through line 4A through each trigger 35 and this condensate from each trigger 35 is returned through line 5A to the steam generator 66. Plenums and a draft stack 6A are installed to induce a flow of cool atmospheric air across the fins of the heat tube bundle during emergencies.

So long as condensate is circulating through trigger 35, the heat pipes 30A have the working fluid solidified in the region of the trigger which renders the heat pipe inoperative to transfer heat. If there is a failure in circulation of condensate, the working fluid in the heat pipes 30 melts and the heat pipe begins to function as described above for FIG. 4.

The three-phase heat pipes, both automatic and triggered, have been described for vertically-oriented, gravity-type heat pipe. The horizontally-oriented, capillary-wick-type heat pipes can be operated by using a working fluid (liquid) which has the correct melting point and thus transfers heat from one end of the pipe to the other, as in the case of the capillary wick-type, two-phase heat pipe, but condenses as a solid in the middle or cool end portion of the pipe to stop its operation when that portion of the pipe drops below the melting point of the fluid. The liquid is selected from a handbook chart of freezing points of liquids in the range of operation of the heat pipe. The triggered embodiment of the horizontally-oriented, capillary-wick-type heat pipe has an annulus through which a coolant is circulated to condense the working fluid as a solid and thus inactivate the transfer of heat. When there is a failure of coolant flow through the annulus, the solidified working fluid melts and the heat pipe begins to transfer heat.

While this invention has been described fully and completely with emphasis on certain preferred embodiments, it should be understood that, within the scope of the appended, the invention can be practiced otherwise than as specifically described herein.

I claim:

1. A heat transfer apparatus for transferring heat from a hot region to a colder region comprising
   a heat pipe comprising a tube closed at both ends with one end positioned in said hot region and the other end positioned in said colder region,
   heat exchange means positioned on he outside of said tube on said other end for transferring heat therefrom,
   a heat transfer fluid at said one end of said tube operable to be vaporized by heat from said hot region and the vaporized fluid flowing to said other end of said tube to be condensed to a liquid by releasing heat to said colder region,
   said condensed liquid flowing back to said one end to continue the process of heat transfer,
   said fluid having a melting point below a selected temperature limiting the operation of said apparatus by freezing said condensed liquid adjacent to said other end to prevent further operation when all of said fluid is solidified therein, and
   said heat exchange means solidifying said liquid under first predetermined conditions and preventing solidification of said liquid under other predetermined conditions.

2. A heat transfer apparatus for transferring heat from a hot region to a colder region according to claim 1 in which
   said tube is vertically positioned to permit liquid to flow from said other end to said one end by gravity, and
   the freezing of said liquid preventing said gravity flow by solidifying said liquid in said other end.

3. A heat transfer apparatus for transferring heat from a hot region to a colder region according to claim 1 in which
   said tube is horizontally positioned and includes capillary flow means extending form said other end to said one end to effect flow of liquid therebetween by capillary action, and
   the freezing of said liquid preventing said capillary flow by solidifying said liquid in said other end.

4. A heat transfer apparatus for transferring heat from a hot region to a colder region according to claim 1 in which
   the temperature of said colder region is variable and said apparatus operates to transfer heat whenever the temperature of said colder region is above the melting point of said liquid and is inactive to transfer heat whenever the temperature of said colder region is below the melting point of said liquid, thereby limiting the minimum temperature of operation of the apparatus.

5. A heat transfer apparatus for transferring heat from a hot region to a colder region according to claim 1 in which
   the temperature of said hot region is variable, the temperature of said cold region is below the melting point of said liquid and said apparatus operates to transfer heat whenever the temperature of said hot region is sufficient to transfer heat by conduction to melt the solidified liquid and said apparatus is inactive to transfer heat whenever the temperature of said hot region is insufficient to melt said solidified liquid thereby limiting the maximum temperature of operation of said hot region.

6. A heat transfer apparatus for transferring heat form a hot region to a colder region according to claim 1 including
   heat exchange means at the portion of said tube wherein said liquid solidifies for conducting a second fluid in heat exchange relation to said tube operable when the temperature and flow rate of said second fluid are sufficient to prevent solidification of said liquid and operable when the temperature and flow rate of said second fluid are insufficient to permit solidification of said liquid.

7. A heat transfer apparatus for transferring heat from a hot region to a colder region according to claim 1 including
   a heat exchange jacket at the portion of said tube wherein said liquid solidifies for conducting a second fluid in heat exchange relation to said tube operable when the temperature and flow rate of said second fluid therein are insufficient to prevent solidification of said liquid and operable when the temperature and flow rate of said second fluid therein are sufficient to permit solidification of said liquid.

8. A system of apparatus having a hot region requiring transfer of heat to a colder region including heat transfer mean comprising a heat pipe comprising a tube closed at both ends with one end positioned in said hot region and the other end positioned in said colder region, heat exchange means positioned on the outside of said tube on said other end for transferring heat therefrom, a heat transfer fluid at said one end of said tube operable to be vaporized by heat from said hot region and the vaporized fluid flowing to said other end of said tube to be condensed to a liquid by releasing heat to said colder region, said condensed liquid flowing back to said one end to continue the process of heat transfer, said fluid having a melting point below a selected temperature limiting the operation of said apparatus by freezing said condensed liquid adjacent to said other end to prevent further operation when all of said fluid is solidified therein, and said heat exchange means solidifying said liquid under first predetermined conditions and to prevent solidification of said liquid under other predetermined conditions.

9. A system of apparatus according to claim 8 in which said tube is vertically positioned to permit liquid to flow from said other end to said one end by gravity, and the freezing of said liquid preventing said gravity flow by solidifying said liquid in said other end.

10. A system of apparatus according to claim 8 in which said tube is horizontally positioned and includes capillary flow means extending form said other end to said one end to effect flow of liquid therebetween by capillary action, and the freezing of said liquid preventing said capillary flow by solidifying said liquid in said other end.

11. A system of apparatus according to claim 8 in which the temperature of said colder region is variable and said apparatus operates to transfer heat whenever the temperature of said colder region is above the melting point of said liquid and is inactive to transfer heat whenever the temperature of said colder region is below the melting point of said liquid, thereby limiting the minimum temperature of operation of the apparatus.

12. A system of apparatus according to claim 8 in which the temperature of said hot region is variable, the temperature of said cold region is below the melting point of said liquid and said apparatus operates to transfer heat whenever the temperature of said hot region is sufficient to transfer heat by conduction to melt the solidified liquid and said apparatus is inactive to transfer heat whenever the temperature of said hot region is insufficient to melt said solidified liquid thereby limiting the maximum temperature of operation of said hot region.

13. A system of apparatus according to claim 8 including a second heat exchange means at the portion of said tube where said liquid solidifies conducting a second fluid in heat exchange relation to said tube operable when the temperature and flow rate of said second fluid are insufficient to prevent solidification of said liquid and operable when the temperature and flow rate of said second fluid are sufficient to permit solidification of said liquid.

14. A system of apparatus according to claim 8 including a heat exchange jacket at the portion of said tube where said liquid solidifies conducting a second fluid in heat exchange relation to said tube operable when the temperature and flow rate of said second fluid therein are insufficient to prevent solidification of said liquid and operable when the temperature and flow rate of said second fluid therein are sufficient to permit solidification of said liquid.

15. A system of apparatus according to claim 8 including means circulating a second fluid in heat exchange relation with part of said apparatus for regulating temperature thereof, and a heat exchange jacket at the portion of said tube where said liquid solidifies conducting said second fluid in heat exchange relation to said tube operable when the temperature and flow rate of said second fluid therein are insufficient to prevent solidification of said liquid and operable when the temperature and flow rate of said second fluid therein are sufficient to permit solidification of said liquid.

16. A system of apparatus according to claim 8 in which said apparatus comprises a solar water heater and hot water tank supplied with hot water from said heater, said hot water tank comprising said hot region, said heat pipe being positioned vertically in said hot water tank with said other end positioned in said cool region for removal of heat, and said heat transfer fluid having melting point at a temperature selected as the highest safe operating temperature for said apparatus.

17. A system of apparatus according to claim 16 in which said heat transfer fluid is durene or naphthalene.

18. A system of apparatus according to claim 8 in which said apparatus has a wall dividing said hot region from said cooler region, said tube has heat exchange fins facilitating heat transfer to said cooler region, means circulating a second fluid in heat exchange relation with part of said apparatus for regulating temperature thereof;

a heat exchange jacket at the portion of said tube where said liquid solidifies conducting said second fluid in heat exchange relation to said tube operable when the temperature and flow rate of said second fluid therein are insufficient to prevent solidification of said liquid and operable when the temperature and flow rate of said second fluid therein are sufficient to permit solidification of said liquid.

19. A system of apparatus according to claim 18 in which failure of flow of said second fluid causes said solidified fluid to melt.

20. A system of apparatus according to claim 8 in which said apparatus has a wall with a heat pipe tube supported therein, the upper end of said heat pipe tube comprising said hot region, and said tube has heat exchange fins facilitating heat transfer to said cooler region, means circulating a second fluid in heat exchange relation with part of said apparatus for regulating temperature thereof, a heat exchange jacket at the portion of said tube where said liquid solidifies conducting said second fluid in heat exchange relation to said tube operable when the temperature and flow rate of said second fluid therein are insufficient to prevent solidification of s id liquid and operable when the temperature and flow rate of said second fluid therein are sufficient to permit solidification of said liquid.

21. A system of apparatus according to claim 8 in which said apparatus comprises a power plant having at least one coolant circulatory system for temperature control and safety, said apparatus has a wall dividing said hot region from said cooler region, said tube has heat exchange fins facilitating heat transfer to said cooler region, means circulating a portion of the coolant in said coolant circulatory system in heat exchange relation with part of said apparatus for regulating temperature thereof, a heat exchange jacket at the portion of said tube where said liquid solidifies conducting said coolant portion in heat exchange relation to said tube operable when the temperature and flow rate of said coolant portion therein are insufficient to prevent solidification of said liquid and operable when the temperature and flow rate of said coolant portion therein are sufficient to permit solidification of said liquid.

22. A system of apparatus according to claim 21 in which said coolant circulatory system is the primary coolant for the apparatus.

23. A system of apparatus according to claim 21 in which said coolant circulatory system is from a secondary coolant system for the apparatus.

24. A heat pipe comprising a tube closed at both ends with one end adapted to be positioned in a hot region and the other end adapted to be positioned in a colder region, a heat transfer fluid at said one end of said tube operable to be vaporized by heat from said hot region and the vaporized fluid flowing to said other end of said tube to be condensed to a liquid by releasing heat to said colder region, said condensed liquid flowing back to said one end to continue the process of heat transfer, said fluid having a melting point below a selected temperature limiting operation by freezing said condensed liquid adjacent to said other end to prevent further operation when all of said fluid is solidified therein, a heat exchange jacket at the portion of said tube where said liquid solidifies, said jacket conducting a second fluid in heat exchange relation to said tube, said second fluid solidifying said liquid during one condition of said fluid and preventing solidification of said liquid during another condition of said fluid.

25. A heat pipe according to claim 24 in which said tube is vertically positioned to permit liquid to flow from said other end to said one end by gravity, and the freezing of said liquid preventing said gravity flow by solidifying said liquid in said other end.

26. A heat pipe according to claim 24 in which said tube is horizontally positioned and includes capillary flow means extending from said other end to said one end to effect flow of liquid therebetween by capillary action, and the freezing of said liquid preventing said capillary flow by solidifying said liquid in said other end.

* * * * *